Figure 1:
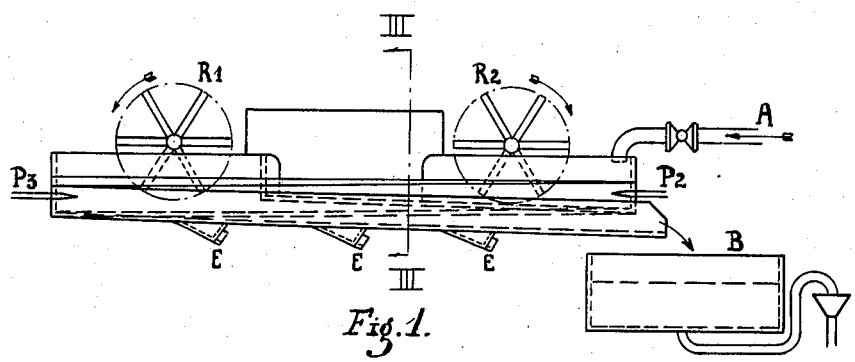

April 12, 1932.   E. MERTENS   1,853,871
PROCESS OF EXTRACTING NEUTRAL GREASE FROM
WOOL SCOURING WATER AND TREATING SAME
Filed March 8, 1929

Inventor:
Eugène Mertens
By Samuel W. Balch Attorney

Patented Apr. 12, 1932

1,853,871

UNITED STATES PATENT OFFICE

EUGÈNE MERTENS, OF LOUVAIN, BELGIUM

PROCESS OF EXTRACTING NEUTRAL GREASE FROM WOOL SCOURING WATER AND TREATING SAME

Application filed March 8, 1929, Serial No. 345,553, and in Belgium November 6, 1928.

My present invention has for its object to provide an improved process of extracting neutral grease contained in wool scouring water and subsequently treating same for obtaining grease designed for pharmaceutical and industrial purposes.

The water used for scouring wool contains up to 2-3% of neutral grease according to the nature of the wool treated and the scouring process.

The neutral grease of the wool is distributed in the scouring water in the state of fine particles in presence of soap, potash, mineral impurities, albumenoids and other organic impurities.

The problem to be solved consists in removing such grease without too many impurities and then purifying same to remove soap, mineral and organic impurities, particularly albumenoids therefrom, so as to obtain perfectly neutral, unalterable grease which does not grow rancid and is scentless and of light yellow colour.

Heretofore in many cases sulphuric acid has been used for obtaining such neutral grease from wool. The scouring water has been treated with sulphuric acid to separate the whole of the fatty materials, fatty acids and neutral grease from the water and impurities. Or the fat and grease was first concentrated in the scum obtained upon mechanically churning the water and such scum was treated with sulphuric acid. Fatty materials were then separated by filtration and a mixture of fatty acids from soap and neutral grease from yelk has been obtained. The neutral grease was extracted from such mixture by means of various processes which are imperfect and expensive and by which it is adulterated and loses the major part of its value. It has also been suggested to extract neutral grease from scouring water by means of purely mechanical processes without the use of reagents. By mixing air with the water to be treated and throwing such mixture against a partition, the substances in suspension, colloidal substances and particles of neutral grease will be agglutinated and may be separated from water. Such processes are objectionable in that they are very expensive and produce very impure rough grease which is not easily treated by the usual refining processes.

Some processes have also been proposed which cause flotation of the fatty substances according to the known process of froth flotation by means of finely divided bubbles of air and then stabilizing the floated particles by washing out the film of liquor covering them, and, by this means, causing the particles to adhere together, especially when they have cooled and hardened. These processes are objectionable in that they are very expensive owing to the quantity and pressure of air required to float the fatty substances, and their operation is most difficult owing to the necessity of dealing with the liquor at certain exact conditions of temperature.

The process of recovering neutral grease according to this invention consists in the combination of the following steps carried out successively.

As above stated, the neutral grease of the wool is distributed in the scouring water as fine particles. These will not separate from the water because of their minuteness, for their adherence to the water is equal to or greater than their tendency to rise owing to the difference in the specific gravity between them and the water. The first step of this invention consists in beating or churning the wool scouring water, preferably when it is cold, and thereby causing the fine particles of grease to be thrown against each other and to agglutinate into larger particles which separate from the water, their adherance to the liquor being less than their buoyancy due to their lesser specific gravity as compared with the liquor. The larger particles of grease thus formed rise to the surface of the liquor, also, especially during the beating of the water, the emulsifying agents, such as soap, from a very light foam which helps the particles of grease to rise, and consequently facilitates their removal.

The second step of this invention is the washing of such foam to remove the soap and other soluble substances and to precipitate a part of the albuminoids, mineral impurities, and other heavy substances. This washing of the foam therefore effects a purification of the recovered grease. Part of these heavy impurities are eliminated as the particles of grease are carried away by water containing soap and other soluble substances in solution into a collecting tank where the grease rises to the surface of the water and is removed for further treatment while the water is disposed of as may be found useful. The grease as recovered appears in the form of an emulsified scum which contains about 75% water, 20% neutral grease and 5% soap, albuminoids and mineral impurities. This emulsified scum does not melt when heated, but swells and rises like milk. The third step of this invention consists in treating this product in a digester under a pressure of two to three atmospheres and an adequate temperature of 90 to 120 degrees centigrade. In the digester, the emulsion is destroyed due to the fact that the product cannot swell because of the pressure, and the albuminoids coagulate and sink to the bottom together with the heavy impurities.

The grease recovered from the digester is practically anhydrous and scentless, and may be used for many purposes. It may be easily refined by the usual processes for removing remaining impurities.

The improved process is particularly simple and does not require complicated devices, low motive power being sufficient for driving the churning apparatus. The washing of the scum requires a small amount of water only if good atomizers are used. The treatment in the digester, which may be effected continuously or not, requires very few calories only.

Having thus explained the principles of this invention, it will now be described, by way of example, in connection with a schematic illustration.

Figure 2:
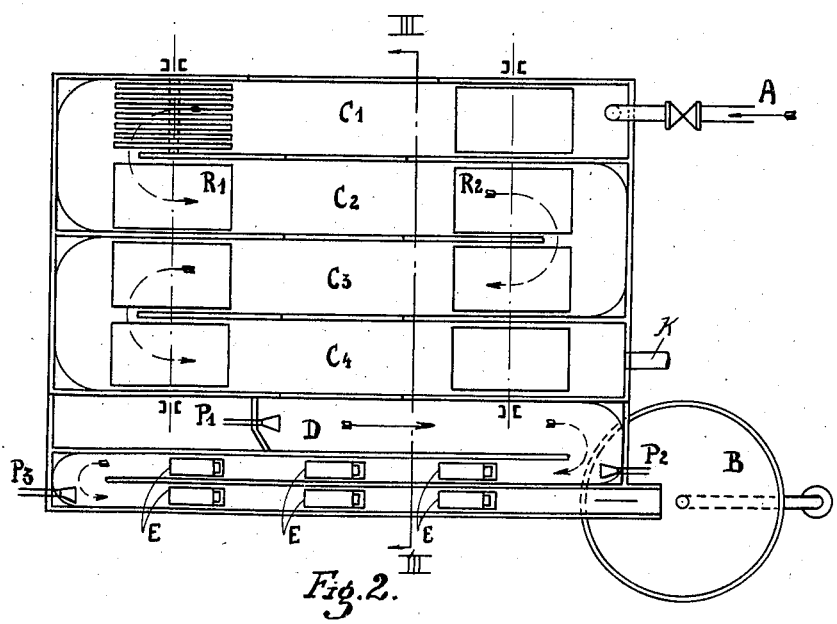

In the accompanying sheet of drawings which forms a part of this description, Figure 1 is an elevation of an apparatus for carrying out this invention which includes a churning apparatus with four pairs of paddle wheels, a washing channel and a collecting tank with a constant head of water. Fig. 2 is a plan view of the same, and Fig. 3 is a vertical section on the line III—III of Figs. 1 and 2.

The apparatus comprises parallel channels $C_1$, $C_2$, $C_3$ and $C_4$ arranged side by side. These channels are slightly inclined so that water fed into the first channel from the pipe A flows down along the channels and is constantly discarded through a discharge pipe K. Across the channels are provided four pairs of paddle wheels mounted on two axles. Fig. 1 shows such paddle wheels $R_1$ and $R_2$. These turn in opposite directions as indicated by the arrows. When passing under the paddle wheels, the water is beaten or churned, and thereby the particles which are too fine to separate from the water are agglutinated into larger particles which can separate from the water and rise to its surface. At the same time a scum is produced owing to the presence in the water of soap and other emulsifying agents, and this scum helps the particles of grease to rise to the surface. The scum and the particles of surface. The scum and the particles of grease collect in the channels between the two lines of paddle wheels. Here the sides extend only an inch or two above the level of the water. The outer wall W of the first channel $C_1$ is at a certain level and the successive inner walls $W_1$, $W_2$, $W_3$ and the outer wall $W_4$ are at progressively lower levels. The scum containing grease in suspension produced in the trough $C_1$ collects in the space between the paddle wheels and accumulates on top of the water. When this scum rises above the top of the wall $W_1$, it spills over this wall into the channel $C_2$. Likewise the scum accumulates in the channels $C_2$, $C_3$ and $C_4$ and overflows from each into the next and finally over the wall $W_4$, into the washing channel D. This channel as shown in Figs. 2 and 3 is formed of several sections D, $D_1$, and $D_2$ with a slope. In this channel are provided atomizers $P_1$, $P_2$ and $P_3$ which spray finely divided water upon the scum which flows in the direction of the arrows. This spraying of the scum dissolves the soap and other soluble substances contained in the scum and washes out mineral impurities and albumenoids. These settle down on the bottom of the channel and collect in the pockets E, E in the floor of the channel and are withdrawn therefrom as the pockets become filled. The scum and water flow to the tank B. The particles of grease collect at the surface of the water and the water with soap and other soluble substances are extracted by a known device which maintains a constant level of water in the tank.

The emulsion of grease is then treated in a digester under a pressure of two to three atmospheres and at a temperature of 90 to 120 degrees centigrade as explained.

Having now fully described my said invention, what I claim and desire to secure by Letters Patent, is:

The process of extracting neutral grease from wool scouring water and treating the same, which consists in churning the wool scouring water for the purpose of producing scum containing neutral grease particles, sprinkling finely divided water upon such scum, separating the washed scum from the impurities by decantation, and heating the scum up to a pressure of two to three atmospheres for separating neutral, practically anhydrous and scentless grease.

EUGÈNE MERTENS.